United States Patent
Eckel

(10) Patent No.: US 8,167,368 B2
(45) Date of Patent: May 1, 2012

(54) AIR CONDITIONING DEVICE FOR VEHICLE SEATS

(75) Inventor: Peter Eckel, Staetzling (DE)

(73) Assignee: W.E.T. Automotive System AG, Odelzhausen (DE)

(*) Notice: Subject to any disclaimer, the term of this patent is extended or adjusted under 35 U.S.C. 154(b) by 133 days.

(21) Appl. No.: 12/705,751

(22) Filed: Feb. 15, 2010

(65) Prior Publication Data
US 2010/0209230 A1    Aug. 19, 2010

(30) Foreign Application Priority Data
Feb. 18, 2009  (DE) .................. 10 2009 009 424

(51) Int. Cl.
A47C 7/74    (2006.01)
(52) U.S. Cl. ........................ 297/180.14; 297/180.13
(58) Field of Classification Search ............ 297/180.13, 297/180.14
See application file for complete search history.

(56) References Cited

U.S. PATENT DOCUMENTS

| | | | |
|---|---|---|---|
| 1,475,912 A | 11/1923 | Williams | |
| 1,537,460 A | 5/1925 | Campbell et al. | |
| 1,936,960 A | 11/1933 | Bowman | |
| 2,022,959 A | 12/1935 | Gordon | |
| 2,493,303 A | 1/1950 | McCullough | |
| 2,544,506 A | 3/1951 | Kronhaus | |
| 2,703,134 A | 3/1955 | Mossor | |
| 2,782,834 A | 2/1957 | Vigo | |
| 2,992,604 A | 7/1961 | Trotman et al. | |
| 2,992,605 A | 7/1961 | Trotman et al. | |
| 3,030,145 A | 4/1962 | Kottemann | |
| 3,552,133 A | 1/1971 | Lukomsky | |
| 3,628,829 A | 12/1971 | Heilig | |
| 3,732,944 A | 5/1973 | Kendall | |
| 3,736,022 A | 5/1973 | Radke | |
| 4,002,108 A | 1/1977 | Drori | |
| 4,141,585 A | 2/1979 | Blackman | |
| 4,413,857 A | 11/1983 | Hayashi | |
| 4,509,792 A | 4/1985 | Wang | |
| 4,563,387 A | 1/1986 | Takagi et al. | |
| 4,671,567 A | 6/1987 | Frobose | |
| 4,777,802 A | 10/1988 | Feher | |
| 4,847,933 A | 7/1989 | Bedford | |
| 4,853,992 A | 8/1989 | Yu | |
| 4,905,475 A | 3/1990 | Tuomi | |

(Continued)

FOREIGN PATENT DOCUMENTS

DE    1995497 U    10/1968

(Continued)

OTHER PUBLICATIONS

Automotive Heated Seats—Heated Steering Wheels, IGB Automotive Ltd., received by Assignee W.E.T. Automotive Systems, May 2003.

(Continued)

*Primary Examiner* — Rodney B White
(74) *Attorney, Agent, or Firm* — Dobrusin & Thennisch PC

(57) ABSTRACT

Disclosed is a fastening mechanism (50) to secure an air delivery device (21) to a carrier device (40). It is specified that this is provided with at least one swivel mechanism (17), which enables a swiveling of the air delivery device (21) relative to the carrier device (40), and at least one fastening mechanism (50), which holds the swivel mechanism (17) on the carrier device (40).

20 Claims, 1 Drawing Sheet

U.S. PATENT DOCUMENTS

Figure 1:
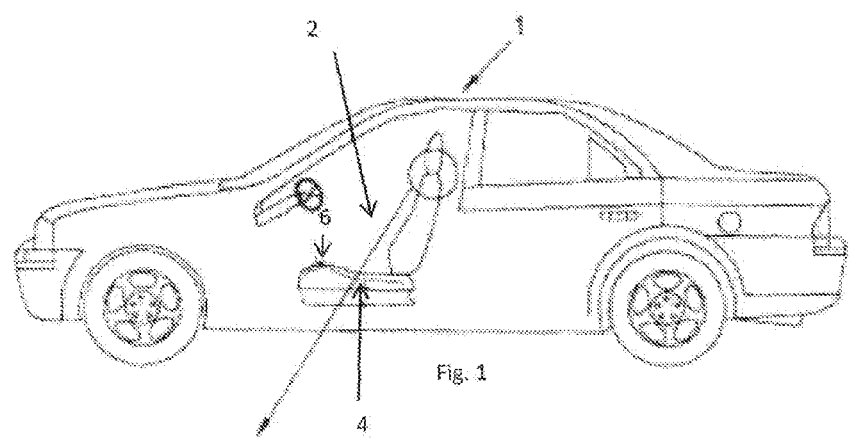

| | | | |
|---|---|---|---|
| 4,923,248 A | 5/1990 | Feher | |
| 4,964,674 A | 10/1990 | Altmann et al. | |
| 4,981,324 A | 1/1991 | Law | |
| 5,002,336 A | 3/1991 | Feher | |
| 5,016,302 A | 5/1991 | Yu | |
| 5,102,189 A | 4/1992 | Saito et al. | |
| 5,106,161 A | 4/1992 | Meiller | |
| 5,117,638 A | 6/1992 | Feher | |
| 5,138,851 A | 8/1992 | Mardikian | |
| 5,160,517 A | 11/1992 | Hicks et al. | |
| 5,354,117 A | 10/1994 | Danielson et al. | |
| 5,356,205 A | 10/1994 | Calvert et al. | |
| 5,372,402 A | 12/1994 | Kuo | |
| 5,382,075 A | 1/1995 | Shih | |
| 5,385,382 A | 1/1995 | Single, II et al. | |
| 5,403,065 A | 4/1995 | Callerio | |
| 5,450,894 A | 9/1995 | Inoue et al. | |
| 5,524,439 A | 6/1996 | Gallup et al. | |
| 5,597,200 A | 1/1997 | Gregory et al. | |
| 5,613,729 A | 3/1997 | Summer, Jr. | |
| 5,626,021 A | 5/1997 | Karunasiri et al. | |
| 5,692,952 A | 12/1997 | Chih-Hung | |
| 5,902,014 A | 5/1999 | Dinkel et al. | |
| 5,918,930 A | 7/1999 | Kawai et al. | |
| 5,921,100 A | 7/1999 | Yoshinori et al. | |
| 5,921,314 A | 7/1999 | Schuller et al. | |
| 5,921,858 A | 7/1999 | Kawai et al. | |
| 5,924,766 A | 7/1999 | Esaki et al. | |
| 5,927,817 A | 7/1999 | Ekman et al. | |
| 5,934,748 A | 8/1999 | Faust et al. | |
| 6,003,950 A | 12/1999 | Larsson | |
| 6,019,420 A | 2/2000 | Faust et al. | |
| 6,048,024 A * | 4/2000 | Wallman | 297/180.14 |
| 6,050,890 A * | 4/2000 | Bayer et al. | 297/180.14 X |
| 6,062,641 A | 5/2000 | Suzuki et al. | |
| 6,179,706 B1 | 1/2001 | Yoshinori et al. | |
| 6,189,966 B1 | 2/2001 | Faust et al. | |
| 6,196,627 B1 | 3/2001 | Faust et al. | |
| 6,224,150 B1 * | 5/2001 | Eksin et al. | 297/180.13 X |
| 6,263,530 B1 | 7/2001 | Feher | |
| 6,277,023 B1 | 8/2001 | Schwarz | |
| 6,278,090 B1 | 8/2001 | Fristedt et al. | |
| 6,291,803 B1 | 9/2001 | Fourrey | |
| 6,300,150 B1 | 10/2001 | Venkatasubramanian | |
| 6,321,996 B1 | 11/2001 | Odebrecht et al. | |
| 6,415,501 B1 | 7/2002 | Schlesselman et al. | |
| 6,425,637 B1 | 7/2002 | Peterson | |
| 6,434,328 B2 | 8/2002 | Rutherford | |
| 6,478,369 B1 | 11/2002 | Aoki et al. | |
| 6,481,801 B1 | 11/2002 | Schmale | |
| 6,483,087 B2 | 11/2002 | Gardner et al. | |
| 6,497,275 B1 | 12/2002 | Elliot | |
| 6,501,055 B2 | 12/2002 | Rock et al. | |
| 6,505,886 B2 | 1/2003 | Gielda et al. | |
| 6,511,125 B1 | 1/2003 | Gendron | |
| 6,539,725 B2 | 4/2003 | Bell | |
| 6,541,737 B1 | 4/2003 | Eksin et al. | |
| RE38,128 E | 6/2003 | Gallup et al. | |
| 6,578,910 B2 | 6/2003 | Andersson et al. | |
| 6,592,181 B2 | 7/2003 | Stiller et al. | |
| 6,598,405 B2 | 7/2003 | Bell | |
| 6,604,785 B2 | 8/2003 | Bargheer et al. | |
| 6,606,866 B2 | 8/2003 | Bell | |
| 6,619,736 B2 | 9/2003 | Stowe et al. | |
| 6,625,990 B2 | 9/2003 | Bell | |
| 6,626,386 B1 | 9/2003 | Stiner et al. | |
| 6,626,455 B2 | 9/2003 | Webber et al. | |
| 6,626,488 B2 * | 9/2003 | Pfahler | 297/180.14 X |
| 6,629,724 B2 | 10/2003 | Ekern et al. | |
| 6,629,725 B1 | 10/2003 | Kunkel et al. | |
| 6,637,210 B2 | 10/2003 | Bell | |
| 6,642,444 B2 | 11/2003 | Hagiwara et al. | |
| 6,664,518 B2 | 12/2003 | Fristedt et al. | |
| 6,672,076 B2 | 1/2004 | Bell | |
| 6,676,207 B2 | 1/2004 | Rauh et al. | |
| 6,682,140 B2 | 1/2004 | Minuth et al. | |
| 6,685,553 B2 | 2/2004 | Aoki | |
| 6,687,937 B2 | 2/2004 | Harker | |
| 6,700,052 B2 | 3/2004 | Bell et al. | |
| 6,719,534 B2 | 4/2004 | Aoki et al. | |
| 6,719,624 B2 | 4/2004 | Hayashi et al. | |
| 6,722,148 B2 | 4/2004 | Aoki et al. | |
| 6,761,399 B2 | 7/2004 | Bargheer et al. | |
| 6,767,621 B2 | 7/2004 | Flick et al. | |
| 6,786,541 B2 | 9/2004 | Haupt et al. | |
| 6,786,545 B2 | 9/2004 | Bargheer et al. | |
| 6,793,016 B2 | 9/2004 | Aoki et al. | |
| 6,808,230 B2 | 10/2004 | Buss et al. | |
| 6,812,395 B2 | 11/2004 | Bell | |
| 6,817,675 B2 | 11/2004 | Buss et al. | |
| 6,826,792 B2 | 12/2004 | Lin | |
| 6,828,528 B2 | 12/2004 | Stöwe et al. | |
| 6,848,742 B1 | 2/2005 | Aoki et al. | |
| 6,869,139 B2 | 3/2005 | Brennan et al. | |
| 6,871,696 B2 | 3/2005 | Aoki et al. | |
| 6,886,352 B2 | 5/2005 | Yoshinori et al. | |
| 6,892,807 B2 | 5/2005 | Fristedt et al. | |
| 6,893,086 B2 | 5/2005 | Bajic et al. | |
| 6,929,322 B2 * | 8/2005 | Aoki et al. | 297/180.14 |
| 6,957,545 B2 | 10/2005 | Aoki | |
| 6,976,734 B2 | 12/2005 | Stoewe | |
| 7,013,653 B2 | 3/2006 | Kamiya et al. | |
| 7,040,710 B2 | 5/2006 | White et al. | |
| 7,052,091 B2 | 5/2006 | Bajic et al. | |
| 7,070,232 B2 | 7/2006 | Minegishi et al. | |
| 7,083,227 B2 | 8/2006 | Brennan et al. | |
| 7,114,771 B2 | 10/2006 | Lofy et al. | |
| 7,131,689 B2 | 11/2006 | Brennan et al. | |
| 7,168,758 B2 | 1/2007 | Bevan et al. | |
| 7,231,772 B2 | 6/2007 | Bell | |
| 7,261,372 B2 * | 8/2007 | Aoki | 297/180.14 |
| 7,290,759 B1 | 11/2007 | Lavrencik | |
| 7,338,117 B2 | 3/2008 | Iqbal et al. | |
| 7,356,912 B2 | 4/2008 | Iqbal et al. | |
| 7,370,911 B2 | 5/2008 | Bajic et al. | |
| 7,581,785 B2 * | 9/2009 | Heckmann et al. | 297/180.14 |
| 7,827,805 B2 | 11/2010 | Comiskey et al. | |
| 7,862,113 B2 * | 1/2011 | Knoll | 297/180.14 |
| 7,866,017 B2 * | 1/2011 | Knoll | 297/180.13 X |
| 2003/0029173 A1 | 2/2003 | Bell et al. | |
| 2004/0195870 A1 | 10/2004 | Bohlender et al. | |
| 2005/0066505 A1 | 3/2005 | Iqbal et al. | |
| 2005/0093347 A1 | 5/2005 | Bajic et al. | |
| 2005/0200179 A1 | 9/2005 | Bevan et al. | |
| 2006/0138810 A1 | 6/2006 | Knoll et al. | |
| 2007/0001507 A1 | 1/2007 | Brennan et al. | |
| 2007/0176471 A1 | 8/2007 | Knoll | |
| 2008/0036249 A1 * | 2/2008 | Heckmann et al. | 297/180.13 |

FOREIGN PATENT DOCUMENTS

| | | |
|---|---|---|
| DE | 41 12 631 | 4/1992 |
| DE | 19805174 | 6/1999 |
| DE | 100 01 314 | 7/2001 |
| DE | 10316732 | 10/2004 |
| DE | 10346064 | 4/2005 |
| EP | 411375 | 5/1994 |
| EP | 0809576 | 5/1999 |
| EP | 1088696 | 9/2000 |
| EP | 1050429 | 11/2000 |
| EP | 1123834 | 2/2001 |
| EP | 1266794 | 12/2002 |
| EP | 1 075 984 | 5/2003 |
| EP | 1323573 | 7/2003 |
| FR | 2630056 | 10/1989 |
| JP | 2004224108 | 8/2004 |
| WO | 97/09908 | 3/1997 |
| WO | 02/053410 | 7/2002 |
| WO | 03/051666 | 6/2003 |
| WO | 03/101777 | 12/2003 |
| WO | 03/106215 | 12/2003 |
| WO | 2004/096601 | 11/2004 |
| WO | 2005/021320 | 3/2005 |
| WO | 2005/035305 | 4/2005 |
| WO | 2005/042301 | 5/2005 |
| WO | 2005/068253 | 7/2005 |
| WO | 2005/110806 | 11/2005 |

OTHER PUBLICATIONS

Automotive Seat Heating Systems, Bauerhin International, received by Assignee W.E.T. Automotive Systems, May 2002.

Excerpt from website http://www.icar.com/html_pages/about_icar/current_events_news/advantage/advantageI-Car Advantage Online.

Excerpt from website http://www.seatcomfort.com/ semashow1.htm, Specializing in Seat Ventilation and Heating Systems, Seat Comfort Systems Unveils 3 New Seat Heater Products.

GMT 830 Heating & Ventilation System, IGB Automotive Ltd., received by Assignee W.E.T. Automotive Systems, Jun. 2003.

Komfortabel bei jeder Temperatur.

Seat Heating Systems, Kongsberg Automotive, believed to be from websitehttp://www.kongsberg-automotive.no/.

Specializing in Seat Ventilation and Heating Systems, Seat Comfort Systems, http://www. seatcomfort.comsemashow1.htm, Jun. 10, 2003.

* cited by examiner

AIR CONDITIONING DEVICE FOR VEHICLE SEATS

CLAIM OF PRIORITY

The present application claims priority from German Application No. DE 102009009424.5, filed on Feb. 18, 2009, disclosure of which is hereby incorporated by reference herein.

FIELD OF THE INVENTION

The present invention concerns a fastening mechanism for a fan for an air conditioning device of a vehicle.

BACKGROUND

Fans for ventilation of seats are usually fixed to the rod assembly of the seat. Such rigid connections between blower and metal structure, however, are not decoupled from vibration. Due to the constant relative motion between blower and frame (caused by the passenger), "fatigue fractures" and thus failure of the fan system can occur. The vibrations of the fan are transmitted directly to the structure and the foam of the seat back. The passenger perceives this as "unpleasant".

Hence, there are also attempts to install fans in a foam cushion of seats. But this is difficult in the case of, e.g., thinly upholstered seats. Alternative possibilities of a seat ventilation without impairing the comfort are therefore desirable.

OBJECT OF THE INVENTION

Against this background, a technical concept is proposed with the features of claim 1. Further advantageous embodiments will be found in the other claims and the following specification.

FIGURES

Details of the invention shall be explained in the following. These remarks should make the invention understandable. However, they are only in the nature of an example. Of course, one or more features can also be omitted, modified or supplemented within the context of the invention as defined by independent claims. The features of different embodiments can also be combined with each other, of course. The critical point is that the concept of the invention is basically implemented. When a feature is to be at least partly fulfilled, this includes that feature also being entirely fulfilled or essentially entirely fulfilled. "Essentially" means here, in particular, that the implementation enables one to accomplish the desired benefit to a recognizable degree. This can mean, in particular, that a corresponding feature is at least 50%, 90%, 95% or 99% fulfilled. If a minimum quantity is indicated, of course more than this minimum quantity can also be used. When the number of a structural part is indicated as at least one, this also includes, in particular, embodiments with two, three or some other plurality of structural parts. What is specified for one object can also be applied to the majority or the entirety of all other similar objects. Unless otherwise indicated, intervals include their boundary points.

Figure 2:
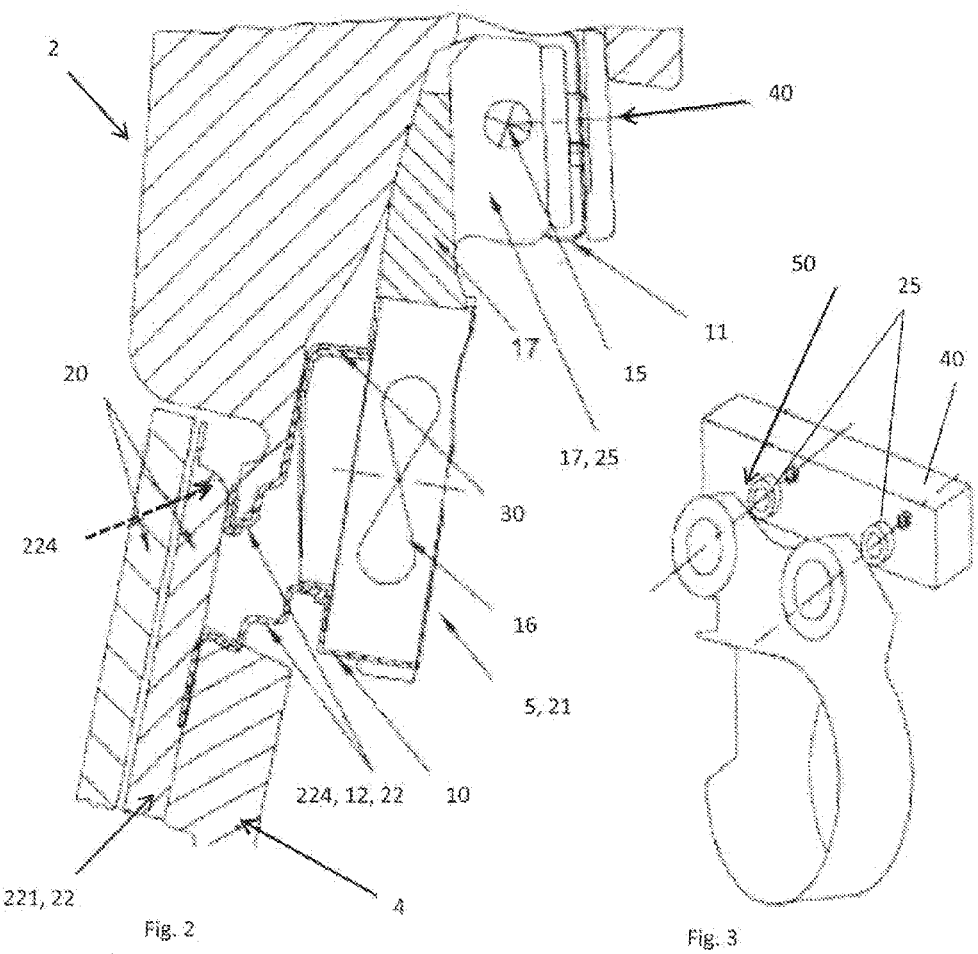
Figure 3:
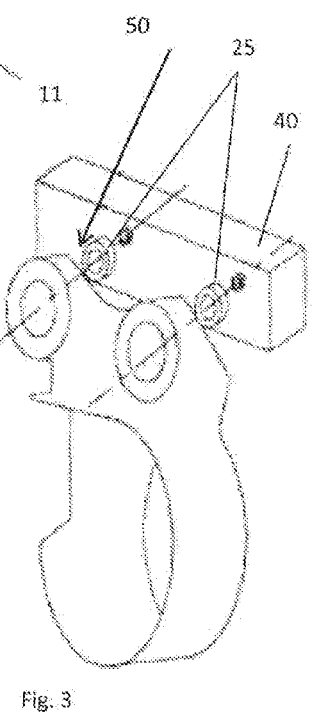

In the following, reference is made to:

FIG. 1 Vehicle 1 with seat as air conditioned object 2 in partial longitudinal section FIG. 2 shows a partial cutout of an air conditioned seat FIG. 3 shows a perspective view of a fan with fastening mechanism.

DETAILED DESCRIPTION OF THE INVENTION

The invention is particularly suited for use in vehicles. This means, in particular, all land, water or air vehicles, such as an airplane, a railway vehicle, a ship or an automobile.

The invention is moreover suitable for use in all objects whose surface needs to be at least partly air conditioned so that at least certain climatic parameter such as temperature or humidity are kept, at least near the surface, in a desired interval or at a particular value. "Climate object" therefore signifies in particular all structural parts with which a user of a vehicle 1 can come into contact in a passenger compartment, such as a steering mechanism for vehicles, a dashboard, a door paneling, a sitting surface, a thermal blanket, an inside roof lining of a vehicle, a cushion 4, a cover 6 or a seat.

Advisedly, at least one vehicle 1 has at least one air conditioned object 2, such as a seat, an interior structural part, a steering mechanism for vehicles, a dashboard, an arm rest, a door paneling, a cushion 4 or a covering 6. This enables a temperature control and air conditioning of a passenger even during lengthy trips.

Advisedly, at least one object 2 has at least one cushion 4, such as a block of foam polyurethane.

Advisedly, at least one object 2 has at least one stiffening or structure-forming carrier device 40 (such as a solid structural frame or rod assembly of a vehicle seat). This is preferably at least partly formed from a metal tube or lattice rod construction.

Advisedly, at least one object 2 has at least one air conditioning device 10. This means all devices which serve to regulate the temperature, humidity, and/or air movement in a zone being air conditioned, such as the temperature control/air conditioning of surfaces in contact with the user in the passenger compartment of a vehicle 1.

Advisedly, at least one object 2 has at least one ventilating device 20. This denotes any device that can be used for deliberate changing of the air composition or the air flows in a particular surface or volume region for air exchange, such as onboard air conditioning unit, at least partly air-permeable spacing media, spacer knitting and/or air conditioning inserts. Their number can be chosen such that, for example, one ventilation device 20 is provided for each object 2 or each surface being air conditioned.

Advisedly, at least one ventilation device 20 has a least one air delivery device 21. This denotes any device that is suitable to moving air in and out of the air conditioned object 2, especially flow machines, such as axial or radial fans. Their number can be chosen such that, e.g., one air delivery device 21 is provided for each object 2 or each surface being air conditioned.

The air delivery device 21 can preferably swivel by means of at least one swivel mechanism 17, mounted by at least one fastening mechanism 50 on a carrier mechanism 40. This holds at least for the preassembled state. In the finally installed air delivery device 21, the swivel capacity is limited to less than 20° about the swivel axis 15, or better less than 10°. For this, the air delivery device 21 is not fastened to rotate about three or four points, as is otherwise customary. Instead, it is mounted on only one side. This means, in particular, that a fastening is done at only a single support point 11, or that several support points are provided, but they all lie jointly in a segment of 180° or less in relation to the axis of rotation of the fan 5. Preferably, the fastening points 11 lie outside the ground surface swept by a blade wheel 16 of a fan 5 of the air delivery device 21 (viewing along the axis of rotation of the blade wheel).

Preferably, two support points 11 and two corresponding fastening mechanisms 50 are provided, which hold a swivel mechanism 17 on a carrier device 40.

At least one air delivery device 21 is fastened, preferably with vibration dampening, to a carrier device 40. For this, preferably at least one swivel mechanism 17 and/or one fastening mechanism 50 has elastic and/or flexible parts. Elastic parts of a swivel mechanism 17 are formed, e.g., by rubber rings 25, which allow a swiveling about fastening points 11 on fastening screws or support clips. The swivel axis 15 lies roughly in the plane of rotation of the blade wheel 16. The swivel axis 15 preferably does not run through the blade wheel 16.

Preferably, at least one fastening mechanism and/or at least one air delivery device 21 is arranged at a distance from a back support. Preferably, they are provided, e.g., at the center of the upper back region, above a lower back support, between a hollow back suspension on the structural frame or between two head rest casings. This is favorable because structural space is available there for the air delivery device 21, since the relative motion between a cushion 4 and the carrier device 40 is the least there, because an upper cross frame of a seat is available there for connecting the air delivery device 21, and the freedom of movement of the rear passenger is limited at his knees at least by the structural space for the air delivery device 21.

Advisedly, at least one ventilation device 20 has at least one air guiding device 22. This makes it possible to guide air from at least one air delivery device 21 to at least one air exchange device 221 or in the opposite direction.

Advisedly, at least one air guiding device 22 has at least one casing device 224. This signifies any device which prevents the air carried in the air guiding device 22 from emerging at an unwanted location from the air guiding device 22, such as foam ducts, films or hoses. Preferably, at least one casing device 224, at least one first sheath segment and/or second sheath segment is at least partly formed from a sheetlike textile material, such as a woven cloth, an air-impermeable film, such as one made of PET, PA, PP or PU, a preferably air-impermeable foam of polyurethane, an air-decelerating layer with textile material or a hard plastic such as polyacrylic, PA or hard PVC.

Advisedly, at least one ventilation device 20 has at least one air exchange device 221. This enables an exchange of air between the air guiding device 22 and a surface of the air conditioned object 2 that is being air conditioned.

Preferably, at least one air exchange device 221 is formed at least partially so that it forms a flat structural part, preferably in the size of a surface being air conditioned. Advisedly, at least one air exchange device 221 has a thickness which is at most 30% of the cushion thickness. The value lies advisedly in the range between 5 and 20 mm, preferably between 10 and 15 mm. This enables an integration in a cushion 4 without affecting its cushioning capacity.

Preferably, at least one air exchange device 221 is arranged at least partially near an air conditioned surface of the object 2 being air conditioned, e.g., between a cushion 4 and a surface being air conditioned, preferably between a foam seat cushion 4 and a seat cover 6, e.g., beneath a cover 6 on the seat side facing the user (A-side). This accomplishes a uniform contact surface dehumidification.

Preferably, at least one air guiding device 22 is formed on at least one coupling segment 12 facing an air delivery device 21 from at least one soft, elastic and/or flexible material, such as vulcanized rubber, silicone, unvulcanized rubber, PVC, polyethylene, polyurethane or the like.

Advisedly, at least one coupling segment 12 is elastic and/or flexible, configured preferably as a bellows, tubes or a spout with rubber of silicone. In this way, the air delivery device 21 is decoupled both from the carrier device 40 of the seat and from the air conditioning device 10 so that little or no vibration is transmitted from the air delivery device 21 to surrounding parts.

The link between air delivery device 21 and coupling segment 12 of the air guiding device 22 is preferably done by a snap connection/locking connection, preferably by an undercut 30 in one part and an encircling tongue in the other part. The sealing of these occurs preferably by pretensioning of the tongue and groove connection.

Preferably at least one air delivery device 21 and at least one coupling segment 12 have different colors from each other. In this way it is possible to identify at once whether the connection has been properly installed (tight sealed).

Preferably at least one coupling segment 12 has at least one flange and/or at least one bracket at least on one end facing an air delivery device 21 and/or at least on one end facing an air exchange device 221. These serve as an installation aid or improve the seal of transitions between different structural parts.

Preferably a clinging layer is sewn onto at least one flange, if the coupling segment 12 consists of a hard to weld or hard to glue material. Such a clinging layer can be formed, e.g., from a textile, such as a fleece. Adjacent structural parts, such as an air exchange device 221, can then be glued or welded to the clinging layer and thus produce an indirect connection to the coupling segment 12.

An air delivery device 21 as described follows along with all movements of a cushion 4 (e.g., when a passenger moves on the seat). Thus, the connection between air delivery device 21 and cushion surface always remains pressure-tight. Thanks to the movable linking to the seat back frame, the air delivery device 21 can be installed very fast. Vibrations of the fan 5 are not transmitted to the metal structure of the seat rod assembly (passenger comfort).

An already fastened air delivery device 21 can also be lifted to achieve more free installation space when joining to the air duct.

LIST OF REFERENCE NUMBERS 1 vehicle
2 object
4 cushion
5 fan
6 cover
10 air conditioning device
11 support point
12 coupling segment
15 swivel axis
16 blade wheel
17 swivel mechanism
20 ventilation device
21 air delivery device
22 air guiding device
25 rubber ring
30 undercut
40 carrier device
50 fastening mechanism
221 air exchange device
224 casing device

The invention claimed is:

1. An air delivery device comprising:
   at least one swivel mechanism and
   a fastening mechanism securing the air delivery device and the at least one swivel mechanism to a carrier device of an interior structural part;
   wherein the at least one swivel mechanism enables the air delivery device to swivel relative to the carrier device, and
   wherein the air delivery device is secured to the carrier device on only one side of the swivel mechanism.

2. An air delivery device according to claim 1, wherein the air delivery device is fastened with a vibration dampening device to the carrier device.

3. An air delivery device according to claim 2, wherein the at least one swivel mechanism, the fastening mechanism, or both comprise elastic parts and/or flexible parts.

4. An air delivery device according to claim 3, wherein the at least one swivel mechanism includes a swivel axis, the swivel axis lies roughly in the plane of rotation of a blade wheel.

5. An air delivery device according to claim 1, wherein the carrier device comprises a solid structural frame or rod assembly of a vehicle seat back support.

6. An air delivery device according to claim 5, wherein the vehicle seat includes at least one ventilation device and a seat cushion.

7. An air delivery device according to claim 6, wherein the at least one ventilation device includes at least one air guiding device, the at least one air guiding device being adapted to guide air from the air delivery device to or from at least one air exchange device.

8. An air delivery device according to claim 7, wherein the at least one air guiding device includes at least one casing device with at least one first sheath segment and/or second sheath segment, the sheath segment at least partly formed from a textile material.

9. An air delivery device according to claim 7, wherein the at least one air exchange device is formed at least partially so that it forms a flat structural part, and
   the at least one air exchange device has a thickness which is at most 30% of a thickness of the seat cushion.

10. An air delivery device according to claim 5, wherein the at least one fastening mechanism, the air delivery device, or both are arranged at a distance from the vehicle back support at a center of an upper back region or between a hollow back suspension on the solid structural frame or between two head rest casings.

11. The air delivery device of claim 1, wherein the fan is free of attachment to a foam cushion of a seat.

12. The air delivery device of claim 1, wherein the air delivery device is free of direct connection to a rod assembly of a seat.

13. The air delivery device of claim 1, wherein the air delivery device has a thickness in a range of between 5 mm and 20 mm.

14. The air delivery device of claim 1, wherein the at least one swivel mechanism includes a swivel axis and the swivel mechanism swivels about the swivel axis up to an angle of about 20 degrees.

15. The air delivery device of claim 1, wherein two support points hold the swivel mechanism and the air delivery device on the carrier device.

16. The air delivery device of claim 1, wherein the air delivery device includes at least one air conditioning device.

17. The air delivery device of claim 16, wherein the air delivery device is attached to an air guiding device via a coupling segment so that the air delivery device is decoupled from the air conditioning device and little or no vibration is transmitted from the air delivery device to surrounding parts.

18. The air delivery device according to claim 17, wherein the at least one swivel mechanism, the fastening mechanism, or both comprise elastic parts and/or flexible parts.

19. An air delivery device comprising:
    at least one swivel mechanism and
    a fastening mechanism securing the air delivery device and the at least one swivel mechanism to a carrier device of an interior structural part of a vehicle seat;
    wherein the at least one swivel mechanism enables the air delivery device to swivel relative to the carrier device,
    wherein the at least one swivel mechanism, the fastening mechanism, or both comprise elastic parts and/or flexible parts so that vibrations of the air delivery device are dampened and are not transmitted to a passenger, and
    wherein the air delivery device is secured to the carrier device on only one side of the swivel mechanism so that the air delivery device moves along with movements of the vehicle seat.

20. The air delivery device of claim 19, wherein the vehicle seat includes at least one ventilation device and a seat cushion.

* * * * *